(12) United States Patent
Nishida et al.

(10) Patent No.: US 7,737,966 B2
(45) Date of Patent: Jun. 15, 2010

(54) METHOD, APPARATUS, AND SYSTEM FOR PROCESSING GEOMETRIC DATA OF ASSEMBLED PARTS

(75) Inventors: Taishi Nishida, Tokyo (JP); Masaaki Kagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 599 days.

(21) Appl. No.: 11/723,134

(22) Filed: Mar. 16, 2007

(65) Prior Publication Data

US 2007/0216681 A1 Sep. 20, 2007

(30) Foreign Application Priority Data

Mar. 16, 2006 (JP) .............................. 2006-073331
Nov. 30, 2006 (JP) .............................. 2006-324922

(51) Int. Cl.
*G06T 15/00* (2006.01)

(52) U.S. Cl. ..................... 345/419; 345/422; 345/619; 345/622; 700/98; 707/102

(58) Field of Classification Search ................. 345/419, 345/422, 619, 622; 700/98; 707/102
See application file for complete search history.

(56) References Cited

U.S. PATENT DOCUMENTS

| 6,300,965 | B1 | 10/2001 | Sowizral et al. | |
| 6,445,391 | B1 * | 9/2002 | Sowizral et al. | 345/421 |
| 6,466,227 | B1 * | 10/2002 | Pfister et al. | 345/619 |
| 6,731,304 | B2 * | 5/2004 | Sowizral et al. | 345/622 |
| 6,897,863 | B2 * | 5/2005 | Kindratenko et al. | 345/421 |
| 7,567,850 | B2 * | 7/2009 | Yamada et al. | 700/98 |
| 2003/0103048 | A1 | 6/2003 | Kindratenko et al. | |
| 2004/0167650 | A1 | 8/2004 | Nasu | |
| 2006/0053071 | A1 | 3/2006 | Yamada et al. | |

FOREIGN PATENT DOCUMENTS

| EP | 1 742 181 A2 | 1/2007 |
| EP | 1 821 253 A1 | 8/2007 |
| JP | 6-176085 | 6/1994 |
| JP | 2003-167922 | 6/2003 |
| WO | WO 01/09742 A2 | 2/2001 |

OTHER PUBLICATIONS

Chung, J.C.H. et al., "Framework for Integrated Mechanical Design Automation", Computer Aided Design, May 2000, pp. 355-365, vol. 32, No. 5-6, Elsevier Publishers.
Rossignac, J., "The 3D Revolution: CAD Access for All!", Shape Modeling and Applications, Mar. 1997, pp. 64-70, Los Alamitos, CA, USA, IEEE.

* cited by examiner

*Primary Examiner*—Phu Nguyen
(74) *Attorney, Agent, or Firm*—Dickstein Shapiro LLP

(57) ABSTRACT

A geometric data processing apparatus which can determine whether a specific component of a three-dimensional model has changed, display two-dimensional images of the specific component and neighboring components thereof, and indicate whether the change in the specific component influences the images of the neighboring components.

13 Claims, 18 Drawing Sheets

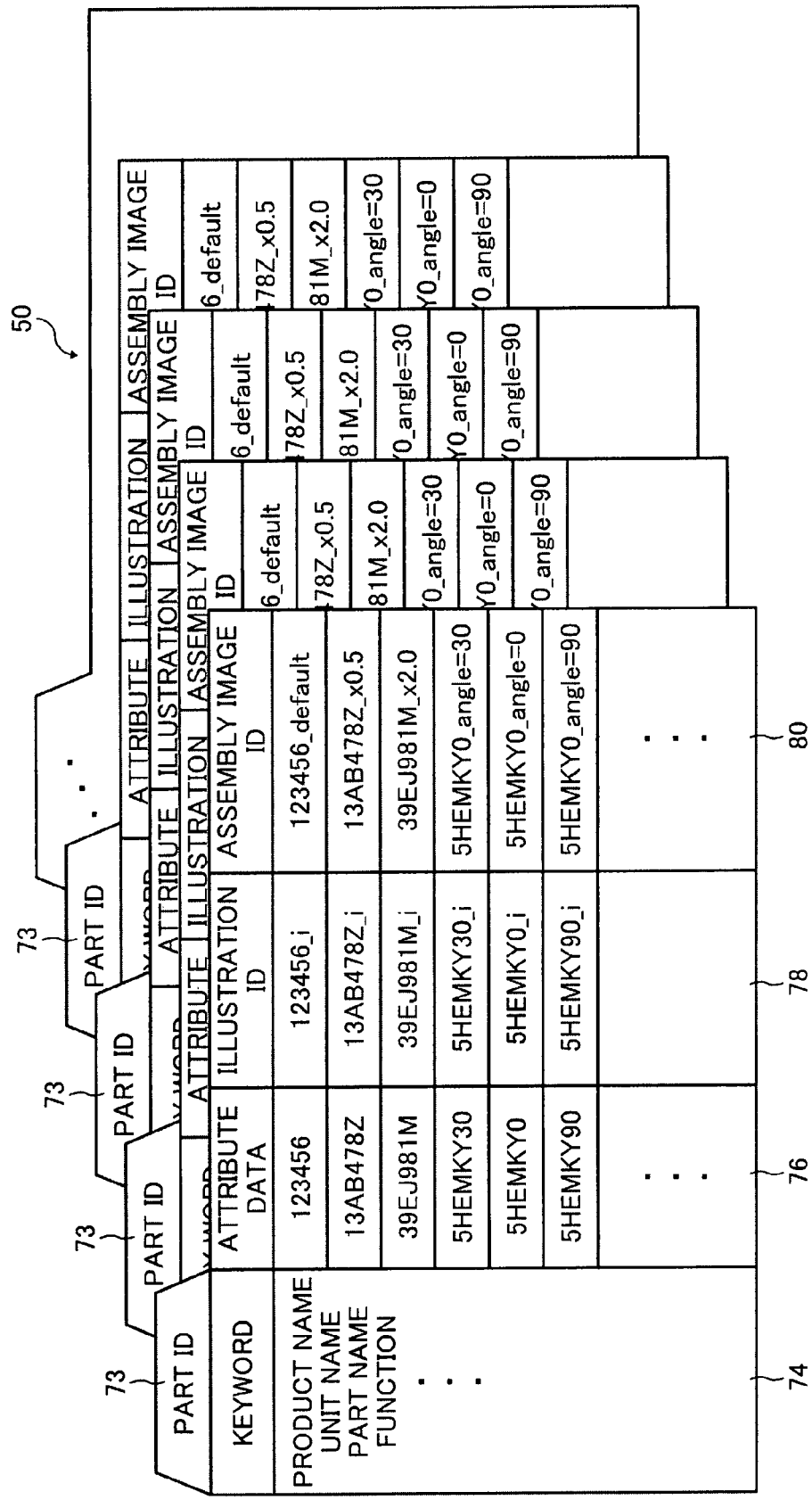

METHOD, APPARATUS, AND SYSTEM FOR PROCESSING GEOMETRIC DATA OF ASSEMBLED PARTS

This patent specification claims priority from Japanese patent applications, No. 2006-073331 filed on Mar. 16, 2006 and No. 2006-324922 filed on Nov. 30, 2006 in the Japan Patent Office, the entire contents of each of which are incorporated by reference herein.

FIELD OF THE INVENTION

The present invention relates to an apparatus and a method for geometric data processing, and more particularly to an apparatus and a method for processing data representing a three-dimensional model.

BACKGROUND OF THE DESCRIBED EMBODIMENTS

Machine products are manufactured by combining multiple parts and/or units. The parts and/or units are defined by location and/or section, and arranged in a parts catalog with assigned numbers for ordering and management.

The production of a parts catalog typically entails disassembly of the machine, preparation of exploded diagrams with illustrations of the parts, identification of the parts by assigning respective identification numbers with leaders and notes, and preparation of an order numbers list showing order numbers corresponding to the assigned identification numbers. The above production method involves high cost and high skill for the preparation of the illustrations and exploded diagrams. The process may be partly carried out in an automatic manner. However, even a partly automated production is manually finished by an operator to improve the page layout and the appearance of the catalog. Moreover, when changes are made to a part of the product, those changes may impel not only revision of the illustrations of that part, but also revision of the illustrations of other neighboring and associated parts.

To order a part using a parts catalog containing illustrations and exploded diagrams, a user typically performs a process of locating the intended part in an exploded diagram to obtain the part number, writing down the part identification number, and searching the order numbers list for an order number corresponding to the part number. This process is prone to errors, which may result in an order for a wrong part.

As can be seen, there is a general need for parts catalogs systems that aid an operator's comprehension of a particular part, such as when revising a parts catalog in view of changes to that particular part or when ordering that particular part. Various systems have been designed to aid an operator's comprehension of the parts within a parts catalog.

For example, Japanese Patent Application Laid-Open No. 06-176085 provides a parts catalog system in which prepared images and attribute information of parts are respectively stored in files. The graphical information and attribute information is recorded as image data and text data, respectively, to form a database used to create a parts list. Some of the attribute information is used to establish a hierarchical relationship between the parts, which improves the operator's general understanding of their organization.

In another example, Japanese Patent Application Laid-Open No. 2003-167922 provides a parts catalog system in which spatial relationships are established between the parts. In this system, an operator may select a desired part from an image of a plurality of parts forming an assembly. When the operator selects one of the assembled parts displayed on a terminal screen, the parts catalog system displays another part relevant to the selected part on the terminal screen, such that the operator may better distinguish between the parts.

As will be evident to those skilled in the art, though conventional parts catalog systems address the need to aid an operator's comprehension of parts within a parts catalog, they do not adequately address the need for a more in depth understanding of such parts.

SUMMARY OF THE DESCRIBED EMBODIMENTS

In one example of the following embodiments, a computer-readable storage device contains a set of instructions that causes a digital device to perform a process. The process includes the steps of: storing or receiving model data of a three-dimensional model representing at least respective locations of components configured to be assembled within a unit; generating image data of a two-dimensional image illustrating a three-dimensional perspective of the three-dimensional model; determining, based on the generated image data of the two-dimensional image, whether the three-dimensional model represents a first component having a configuration that requires revision to a configuration of a neighboring component; and generating image revision data indicating the neighboring component.

In another example of the following embodiments, a geometric data processing apparatus includes a first storage, a second storage, a display device, and a determination mechanism. The first storage is configured to store data of the three-dimensional model. The second storage is configured to temporarily store data in process. The display device is configured to prepare and send a display image in accordance with image revision information to the second storage, and to display the display image thereon. The determination mechanism is configured to determine whether the three-dimensional model data read from the first storage represents a specific component that has a change in shape. The determination mechanism is further configured to calculate and specify neighboring components exposed under an influence of the change of the specific component which involves revision of relevant two-dimensional images corresponding to the neighboring components and converted from respective images of the three-dimensional model at the at least one predetermined angle. In addition, the determination mechanism is further configured to generate the image revision information indicating the specified neighboring components in a predetermined manner, and to send the image revision information to the display device and the second storage.

In another example of the following embodiments, a method of geometric data processing includes: storing or receiving a first set of model data representing a three-dimensional model of components assembled within a unit, the first set of model data being different than a second set of model data representing the three-dimensional model with respect to a change in at least a size or shape of a first component; determining whether the first component of the first set of model data has changed in size or shape; converting the first set of model data to image data of two-dimensional images illustrating three-dimensional perspectives of respective components viewed from the same viewpoint or angle to a plane of the three-dimensional model; specifying, based on the image data of the two-dimensional images, neighboring components influenced by the change of the first component, such that a revision of the two-dimensional images respectively illustrating the neighboring components is required to accommodate the change; and generating image revision information indicating the specified neighboring components; and generating, based on the image revision information, display image information representing a display image that illustrates the first component and specified neighboring components.

In another example of the following embodiments, a method of geometric data processing includes the steps of storing, determining, specifying, generating, first temporarily storing, preparing, second temporarily storing, and displaying. The storing step stores data of a three-dimensional model. The determining step determines whether the three-dimensional model data represents a specific component that has a change in shape. The specifying step specifies neighboring components exposed under an influence of the change of the specific component which involves revision of relevant two-dimensional images corresponding to the specified neighboring components and converted from respective images of the three-dimensional model at the at least one predetermined angle. The generating step generates image revision information indicating the specified neighboring components in a predetermined manner. The first temporarily storing step temporarily stores the image revision information. The preparing step prepares a display image in accordance with the image revision information. The second temporarily storing step temporarily stores the display image. The displaying step displays the display image.

In another example of the following embodiments, a parts catalog system includes: a database; an image generator configured to generate image data for a part based on three-dimensional model data, the image data representing a rendered image of the part and an image of a unit containing the part; an attribute data generator configured to generate attribute data for the rendered image based on the three-dimensional model data, the attribute data including boundary data indicating a boundary of the rendered image; and a parts catalog generator configured to associate a keyword identifying the part, the image data, and the attribute data with one another, and to record the associations, the keyword, the image data, and the attribute data in the database.

In another example of the following embodiments, a parts catalog system includes a database, an image generator, an attribute data generator, and a parts catalog generator. The image generator is configured to generate image data for a part based on three-dimensional model data. The image data includes a rendered image of the part and an image of a unit containing the part. The attribute data generator is configured to generate attribute data for the image data based on the three-dimensional model data. The attribute data includes boundary data indicating a boundary of the rendered image. The parts catalog generator is configured to generate a keyword for retrieving the part. The parts catalog generator is further configured to associate the keyword, the image data, and the attribute data. In addition, the parts catalog generator is configured to record the keyword, the image data, and the attribute data onto the database.

It is to be understood that both the foregoing general description of the invention and the following detailed description of the invention are non-limiting. The drawings and descriptions thereof provide examples of embodiments of the invention, are not intended to be restrictive of the invention.

BRIEF DESCRIPTION OF THE DRAWINGS

A more complete appreciation of the disclosure will be readily obtained by reference to the following detailed description when considered in connection with the accompanying drawings, wherein:

FIG. 11 illustrates data contents of a parts catalog generated by the parts catalog system of FIG. 5;

DETAILED DESCRIPTION OF THE DRAWINGS

Figure 1:
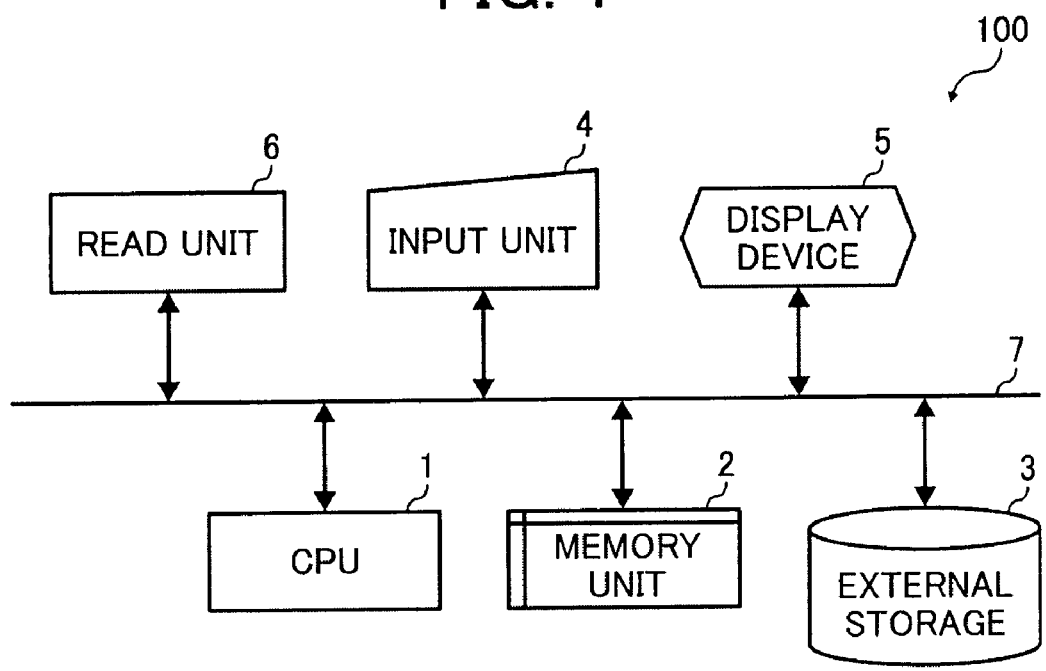
FIG. 1 is a block diagram illustrating a hardware configuration of a geometric data processing apparatus.

In the following description, reference is made to the accompanying drawings, which form a part of this disclosure. The description is provided to set forth a best mode of the invention and to enable those of ordinary skill in the art to make and use the invention. Structural, logical, procedural changes and the like may be made without departing from the spirit and scope of the invention.

In particular, the following description and accompanying drawings illustrate aspects of a parts catalog system. However, the invention is not limited to the context of parts catalog systems or to the specific terminology used to describe such systems. It is to be understood that the described features of these examples embody equivalents that operate in a similar manner.

The parts catalog system may produce a parts catalog for machinery having a complex and sophisticated structure, such as an electrophotographic copier. Part information is organized in a form that is suitable for clear interpretation by an operator, e.g., may be based on spatial and hierarchical relationships between the parts. With the parts catalog system, the operator may create a parts catalog showing a large number of parts in hierarchical and spatial relationships, and spatially identify each part within a unit of assembled parts.

Spatial relationships between the parts may be illustrated by images of the parts' assembly and their respective boundaries, each of which may be displayed as part of a graphical user interface (GUI). As will be evident from the following examples, these images may reduce the time and cost used to comprehend and retrieve information about a part, and may reduce the time to prepare a parts catalog for manufacture, order, or repair of a product.

The parts catalog system may render these images from three-dimensional model data. By using image data of two-dimensional images to determine spatial relationships between the assembled parts, as opposed to using the three-dimensional model data, the parts catalog system may reduce the sizes of the data files used in its operation.

Referring now to the drawings, wherein like reference numerals designate identical or corresponding parts throughout the several views, a geometric data processing apparatus 100 is described.

FIG. 1 illustrates a hardware configuration of the geometric data processing apparatus 100. The geometric data processing apparatus 100 includes a central processing unit (CPU) 1, a memory unit 2 such as random access memory (RAM), an external storage unit 3 such as a hard disk drive, a read unit 6, an input unit 4, a display device 5, and a bus 7. The CPU 1 controls the overall operation of the apparatus 100 according to a program. The memory unit 2 temporarily stores the program and various types of data. The external storage unit 3 stores the program and various types of data, including the three-dimensional model data. The read unit 6 reads data from a removable storage medium (not shown). The input unit 4 has a keyboard and a mouse (not shown) for inputting instructions and various types of data, including the three-dimensional model data. The display device 5 has a display screen for displaying images. The above units are connected to the bus 7.

Figure 2:
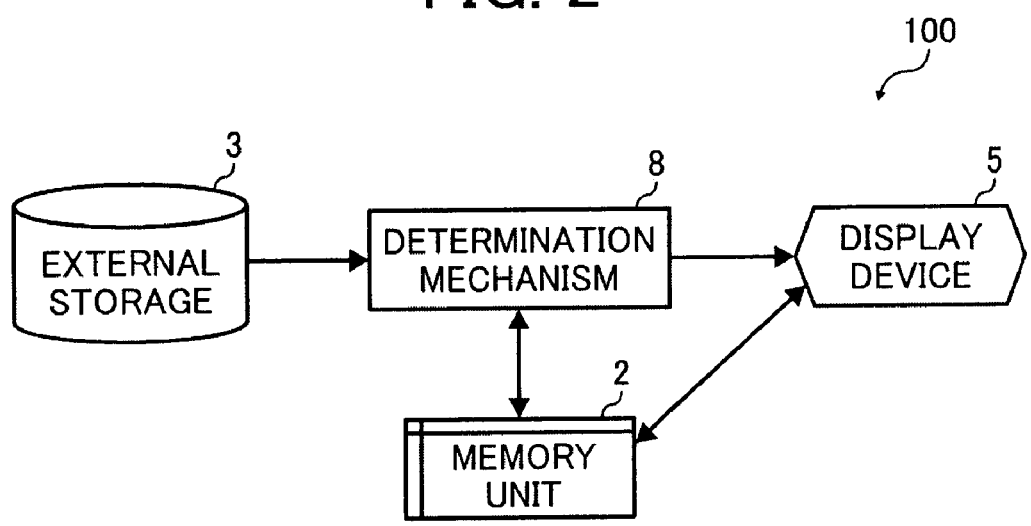
FIG. 2 is a functional block diagram of illustrating the geometric data processing apparatus of FIG. 1.

FIG. 2 is a functional block diagram of the geometric data processing apparatus 100. In FIG. 2, a determination mechanism 8 represents a function performed by the CPU 1. The determination mechanism 8 performs computations on the basis of the three-dimensional model data received from the external storage unit 3. The three-dimensional model data represents a three-dimensional model of parts that may be assembled within a product or other type of unit. Based on the three-dimensional data, the geometric data processing apparatus 100 generates image data for illustrating the parts within one or more two-dimensional images on the display device 5. The display device 5 receives the image data and displays a corresponding output on the display screen. The memory unit 2 temporarily stores the image data output from the determination mechanism 8 to the display device 5.

Those skilled in the art will appreciate that there are numerous ways of converting a three-dimensional model, as viewed from a predetermined angle, to a two-dimensional image providing a three-dimensional perspective of that model. In this example, the predetermined angle may be defined in relation to an arbitrary plane defining coordinate data of the three-dimensional model.

The determination mechanism 8 determines whether a part contained in the three-dimensional model has changed in shape, by detecting a corresponding change in the three-dimensional model data supplied from the external storage unit 3. A change in the three-dimensional model data may be detected by comparing the changed three-dimensional data against prior three-dimensional model data, or by incorporating an indication of such a change, e.g., a flag, within the changed three-dimensional data. The determination mechanism 8 determines an influence of the change on the images of other parts, and then outputs corresponding revision information for image revision of the influenced parts.

Figure 3:
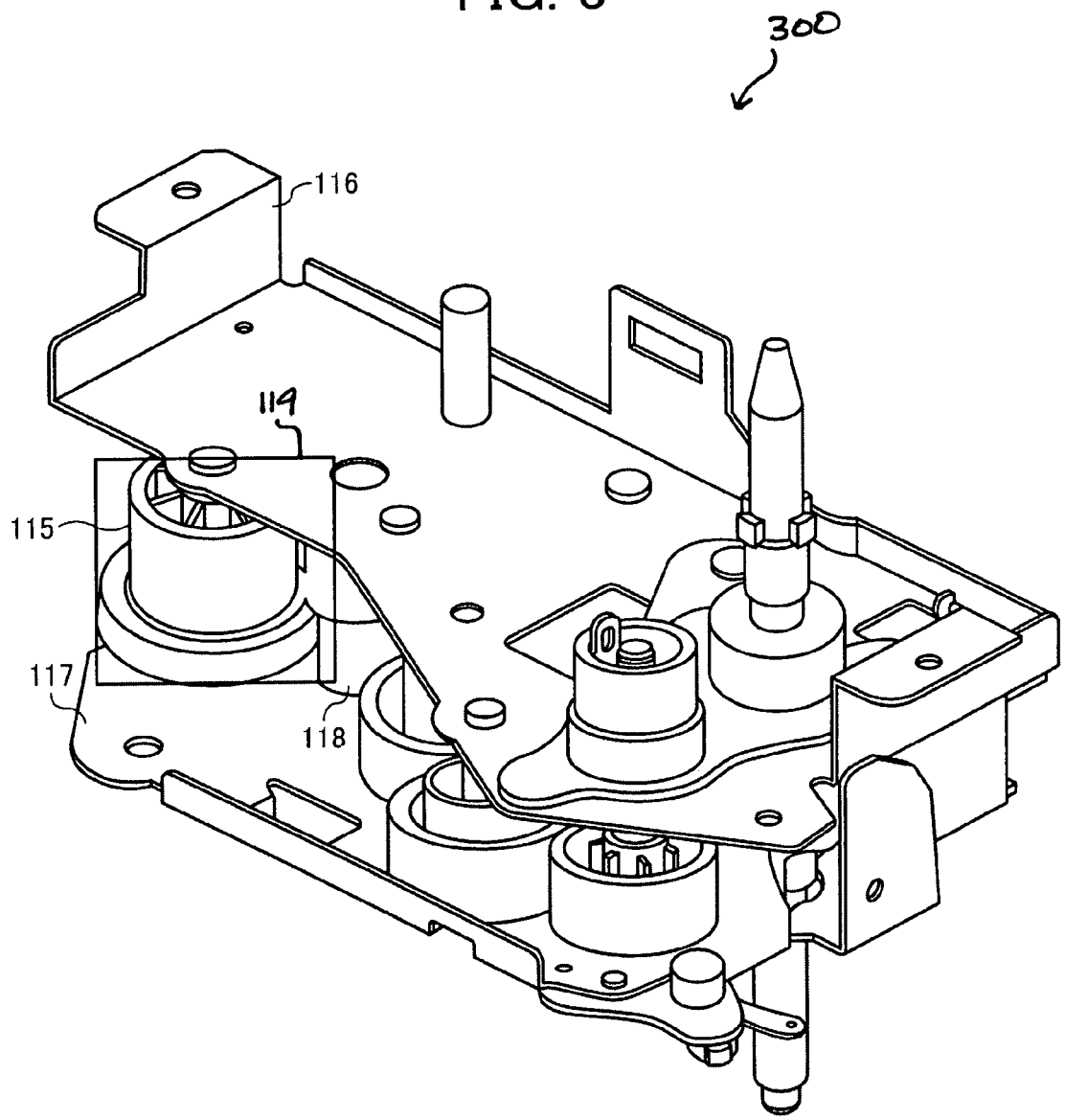
FIG. 3 illustrates a unit of assembled parts containing a changed part.

FIG. 3 illustrates a unit 300 including a changed part 115. As shown in FIG. 3, the unit 300 includes parts 115, 116, 117 and 118. The part 115, enclosed in a rectangle 119 representing a bounding box, is a changed part. The parts 116, 117 and 118 represent parts neighboring the changed part 115. The change in the part 115 influences, and consequently may require the revision of images of the neighboring parts 116, 117 and 118. The determination mechanism 8 determines that the part 115 has changed configuration, e.g., location, size, or shape, and then specifies the parts 116, 117 and 118 whose images may be revised as a result of the change (hereinafter referred to as "relevant parts"). The relevant parts may be one or more parts located in a neighboring area or in the unit 300 including the changed part.

When receiving input data of the three-dimensional model, the geometric data processing apparatus 100 detects a changed part in the three-dimensional model, and checks each of other parts against the changed part 115 to specify the relevant parts 116, 117 and 118. The operation of determining the relevant parts is performed using bounding box information (hereinafter referred to as BBI), which in this example defines the bounding box as the minimum rectangle 119 enclosing an image projection of the changed part 115 on an image plane. The image plane may be defined as orthogonal to a line extending from the changed part 115 to one of the neighboring parts 116, 117 and 118 under consideration, e.g., extending between respective centers of the changed part 115 and neighboring part under consideration, as indicated by their location data.

The geometric data processing apparatus 100 stores the BBI as two points defining a diagonal of the rectangle 119. The geometric data processing apparatus 100 may determine that the neighboring parts 116, 117 and 118 are relevant parts because the boundary box 119 overlaps at least a portion of their respective images. If BBI is available for each of parts 115, 116, 117 and 118, the geometric processing apparatus 100 may determine that the neighboring parts 116, 117 and 118 are relevant because their respective boundary boxes overlap the boundary box 119 of part 115. In that instance, there would be no absolute determination that the change will cause the image of part 115 to influence, e.g., overlap, the respective images of the relevant parts 116, 117 and 118, because those respective images may not extend out to all portions of their respective boundaries. However, an operator of the geometric data processing apparatus 100 would still be made aware of the relevant parts to make a further determination.

Figure 4:
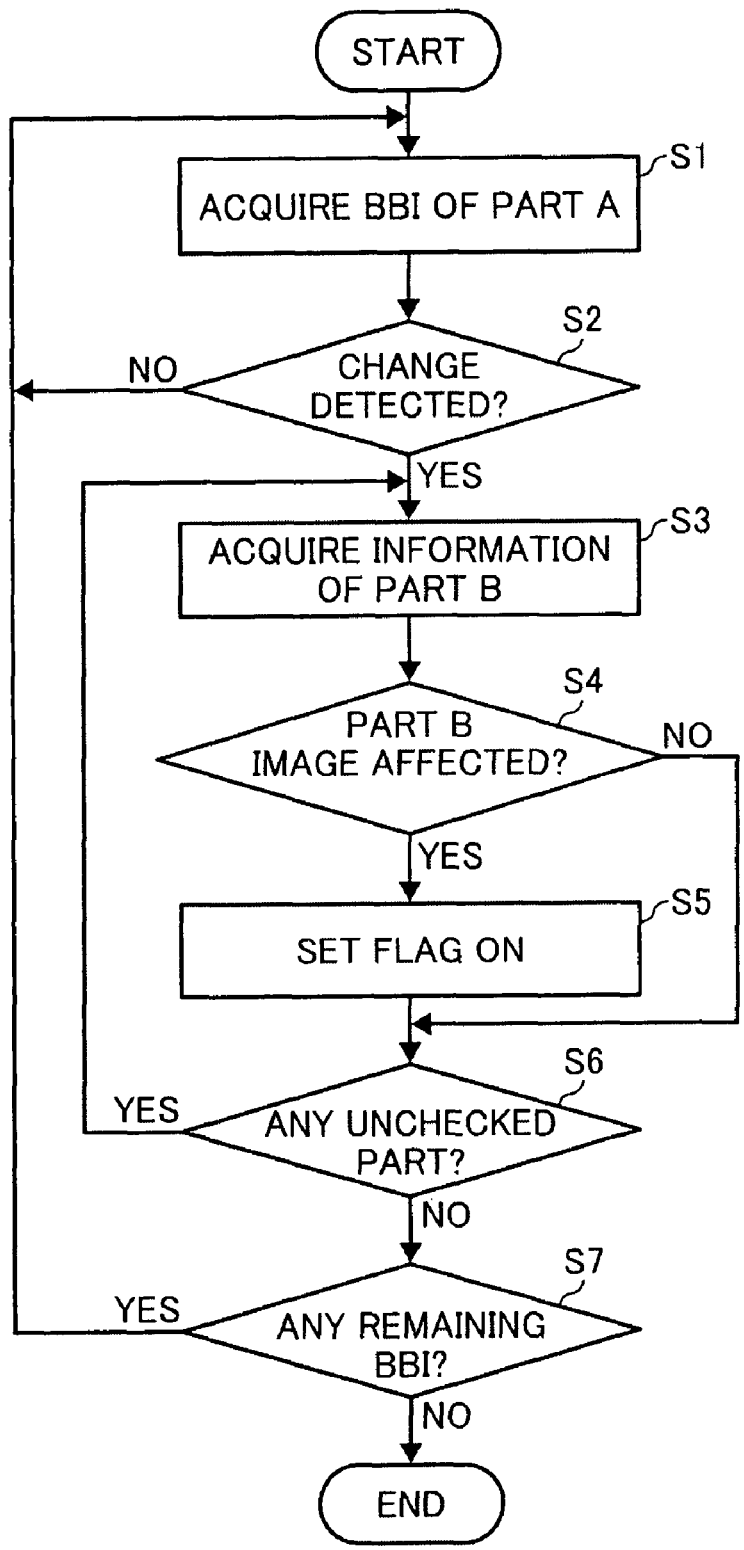
FIG. 4 is a flowchart illustrating an operation of the geometric data processing apparatus of FIG. 1.

FIG. 4 is a flowchart illustrating an operation of the geometric data processing apparatus 100. First, the determination mechanism 8 acquires the BBI of a part A from the external storage 3 (S1). Then, the determination mechanism 8 determines whether the part A is changed (S2). If the part A is not changed (NO in S2), the operation returns to step S1. If the part A is changed (YES in S2), the determination mechanism 8 acquires information of another part B from the external storage 3 (S3) and determines whether the change of the part A causes an effect on the image of part B (S4). If there is no such effect on the part B (NO in S4), the operation proceeds to step S6. If the change of the part A affects the image of part B (YES in S4), the determination mechanism 8 sets a flag to indicate that the images of the part B need revision (S5). Next, the determination mechanism 8 determines whether any unchecked parts remain (S6). If there is an unchecked part (YES in S6), the operation returns to step S3. If no part remains unchecked (NO in S6), the determination mechanism 8 determines whether the BBI of all the parts is received in step S1 (S7). If the BBI of a part remains unreceived (NO in S7), the operation returns to step S1 and repeats steps S1 through S7. If the determination mechanism 8 examines the BBI of all the parts (YES in S7), the operation ends.

Thus, the three-dimensional model processing apparatus 100 determines which parts have changed and which parts have images that accordingly need to be revised. The three-dimensional model processing apparatus 100 may output the result of the determinations as images automatically displayed. Before displaying the resultant images, the three-dimensional model processing apparatus 100 may output a parts list or an assembly image showing the relevant parts with enhancement for verification by a user.

The determination mechanism 8 outputs data indicating the relevant parts, and corresponding information is displayed on a display screen of the display device 5. Such data may be display images representing the relevant parts. The determination mechanism 8 may output respective simplex display images representing each one of the relevant parts and/or a display image representing the assembled parts with enhancement on the relevant parts. For performing enhancement on the relevant parts, the CPU 1 may generate the display image of the assembled parts with the relevant parts highlighted; and/or the display image of the assembled parts with the relevant parts shaded and other parts translucent.

Further, the determination mechanism 8 may output the display images with different viewpoints and/or scales. For example, the determination mechanism 8 may vary zoom level or scale of the display image representing the assembled parts, such that a relevant part is located at an approximate center of the display image on the display screen.

The program designed to execute the above three-dimensional model processing may be recorded on a removable storage medium. The program may be transferred to an information processing device, such as a personal computer, by mounting the removable storage medium or transmitting the program via a network.

Figure 5:
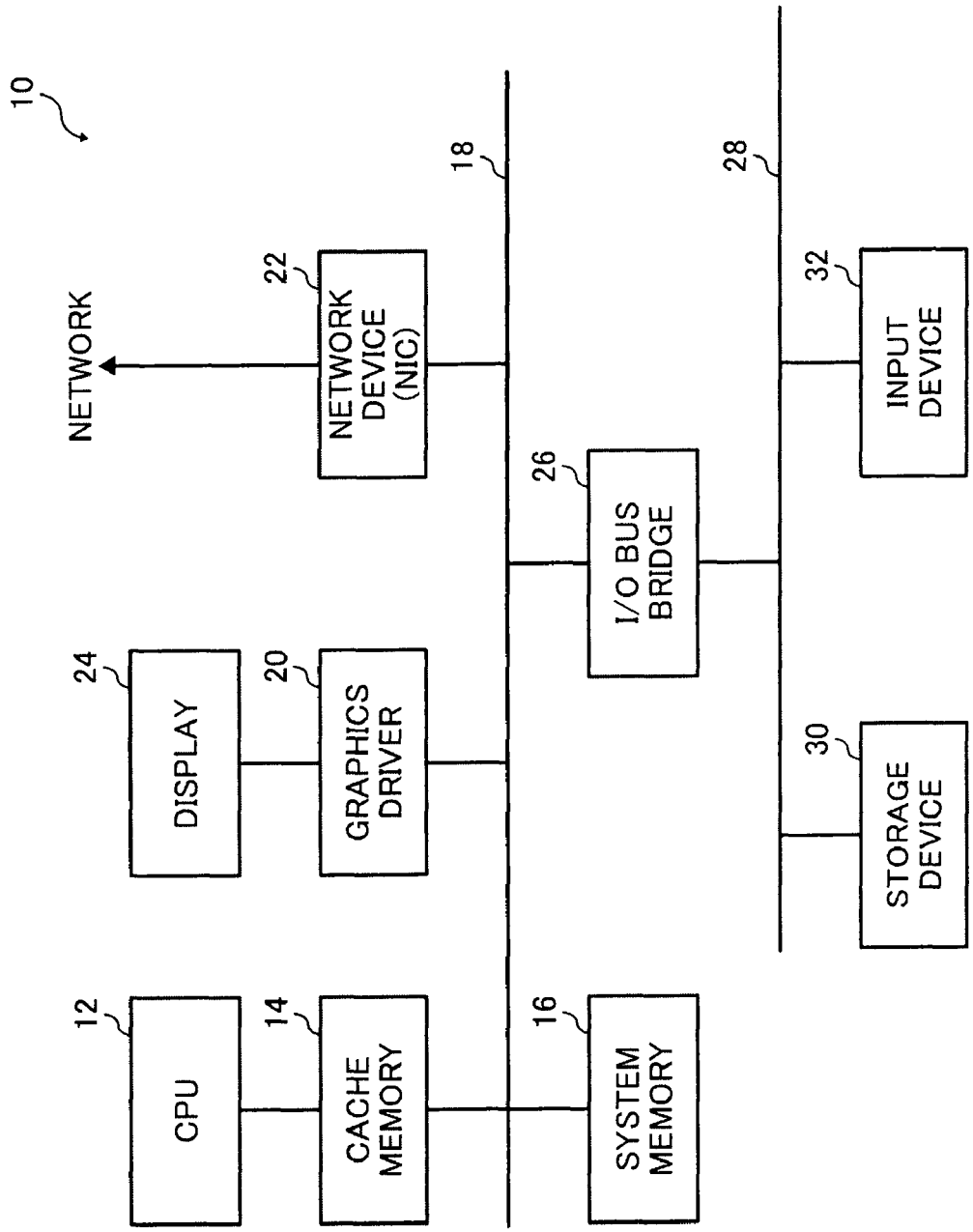
FIG. 5 is a block diagram illustrating a hardware configuration of a parts catalog system.

FIG. 5 is a block diagram illustrating a hardware configuration of a parts catalog system 10. The parts catalog system 10 includes a CPU 12, a cache memory 14, and a system memory 16. The parts catalog system 10 also includes a system bus 18, a graphics driver 20, a network device (NIC) 22, a display 24, an I/O bus bridge 26, an I/O bus 28 such as a peripheral component interconnect (PCI) bus, a storage device 30 such as a hard disk drive, and an input device 32 such as a pointing device including a keyboard and a mouse.

The system bus 18 interconnects the CPU 12, the cache memory 14, and the system memory 16 with other devices and/or drivers such as the graphics driver 20 and the network device 22. The graphics driver 20 is connected to the display 24 via a bus. Further, the system bus 18 is connected downstream to the I/O bus 28 via the I/O bus bridge 26. The storage device 30 is connected to the I/O bus 28 via an interface, such as an integrated development environment (IDE), advanced technology attachment (ATA), ATA packet interface (ATAPI), serial ATA, small computer systems interface (SCSI), or universal serial bus (USB). The input device 32 is connected to the I/O bus 28 via a bus such as a USB.

The cache memory 14 provides fast storage for data accessed by the CPU 12. The system memory 16 is a memory made of solid components such as RAM and dynamic RAM (DRAM) used by the CPU 12. The graphics driver 20 receives output from the CPU 12 and transmits the result to the display 24. The network device 22 connects the parts catalog system 10 to a network to establish a session with a client (not shown). The input device 32 is used by an operator, such as a system manager to provide inputs and instructions. The parts catalog system 10 may be substantially implemented on a personal computer, a workstation, or the like.

A CPU used in the parts catalog system 10 may be one of Pentium to Pentium 4™, Pentium-compatible CPU, PowerPC™, microprocessor without interlocked pipeline stages (MIPS), etc. An operating system (OS) used in the parts catalog system 10 may be one of Mac OS™, Windows™, Windows 200X™ servers, UNIX™, AIX™, LINUX™, and other suitable operating systems. The parts catalog system 10 stores and executes an application program written in an object-oriented programming language such as C++, Visual C++, Visual Basic, Java™, Practical Extraction and Reporting Language (PERL), and Ruby, which may run on the above operating system.

Figure 6:
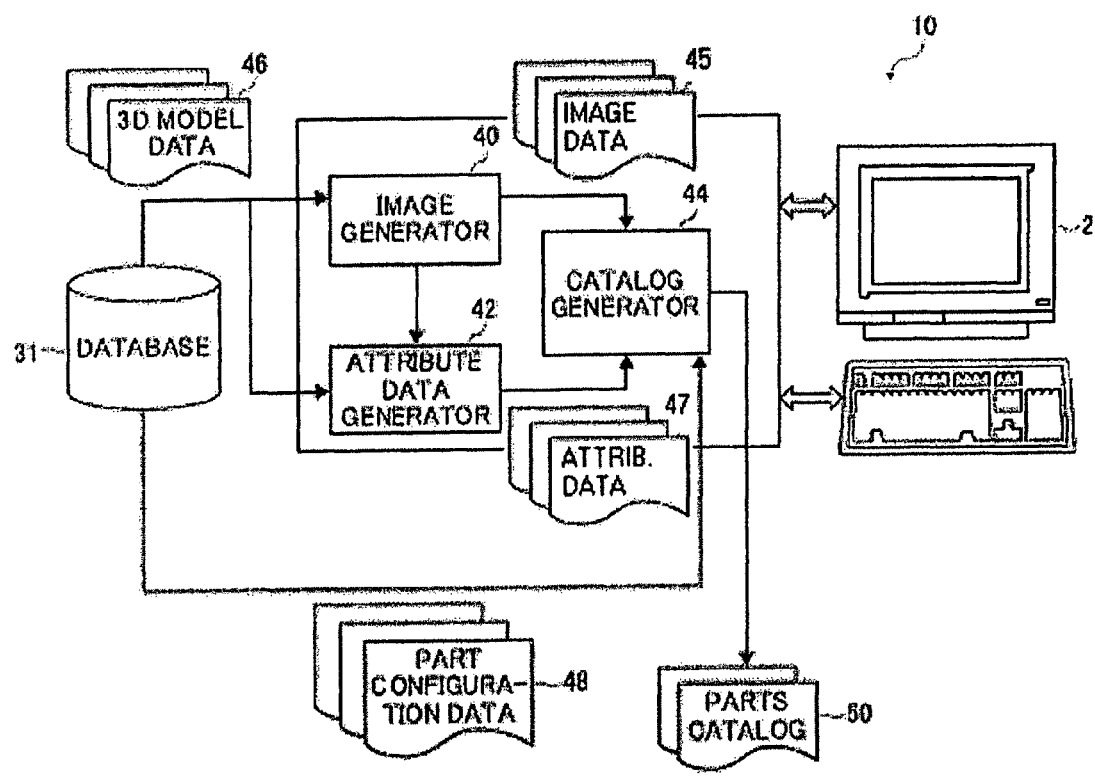
FIG. 6 is a block diagram illustrating a data flow of the parts catalog system of FIG. 5.

FIG. 6 is a diagram illustrating a data flow of the parts catalog system 10. The parts catalog system 10 includes a database 31, an image generator 40, an attribute data generator 42, and a parts catalog generator 44. The database 31 stores three-dimensional model data 46 and part configuration data 48. Examples of data formats of the three-dimensional model data 46 may include but are not limited to 3D Studio Max (3DS)™, MDT™, and data exchange format (DXF). The part configuration data 48 includes information related to a part, such as a product name, usage, a unit name, and a part name. The database 31 may be a known relational database, including any database systems accessible with structured query language (SQL), in which data retrieval may be performed using a keyword.

The image generator 40 reads the three-dimensional model data 46 from the database 31 to generate two-dimensional image data 45. The attribute data generator 42 reads the three-dimensional model data 46 from the database 31 to generate attribute data 47. The parts catalog generator 44 receives the image data 45 and the attribute data 47 and reads the part configuration data 48 from the database 31 to create a keyword for retrieval. The parts catalog generator 44 then records the keyword, the image data 45, and the attribute data 47 to form a parts catalog 50.

When a user inputs a keyword with the input device 32, the parts catalog system 10 displays as output an image of a part (hereinafter referred to as "part image") with an image of an assembly including the part (hereinafter referred to as "assembly image") on the display 24. The parts catalog system 10 may display images of different viewpoints and/or different scales by obtaining additional data for a mouse event given by the user.

Figure 7:
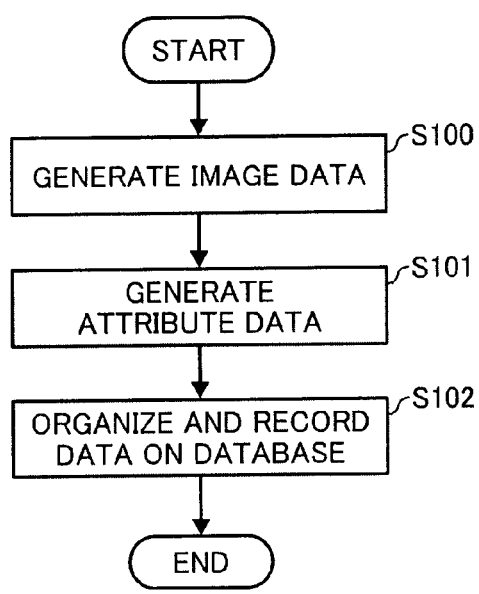
FIG. 7 is a flowchart illustrating a parts catalog production process of the parts catalog system of FIG. 5.

FIG. 7 is a flowchart illustrating parts catalog production by the parts catalog system 10. First, in step S100, the image generator 40 reads and analyzes the three-dimensional model data 46 to create the image data including images of parts and assemblies, and enlarged and reduced images of the assemblies. The image data is stored in one or more various formats such as graphic interchange format (GIF), Joint Photographic Experts Group (JPEG), tagged image file format (TIFF), portable network graphic (PNG), bitmap (BMP)™, or a file format applicable to a particular 3D computer aided design (CAD) system.

In step S101, the attribute data generator 42 reads and analyzes the three-dimensional model data 46 to prepare the attribute data including boundary data and location data. In step S102, the parts catalog generator 44 acquires the part configuration data 48 from the database 31. Then the parts catalog generator 44 extracts part information, such as product name, unit name, and part name from the part configuration data 48 and stores the obtained information in the database 31 in correspondence with the image data and the boundary data to achieve the parts catalog 50.

Figure 8A:
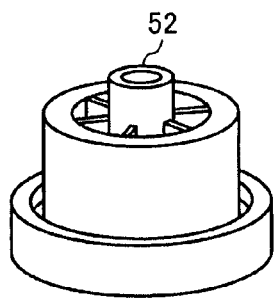
FIGS. 8A, 8B, and 8C illustrate images generated by the parts catalog system of FIG. 5.
Figure 8B:
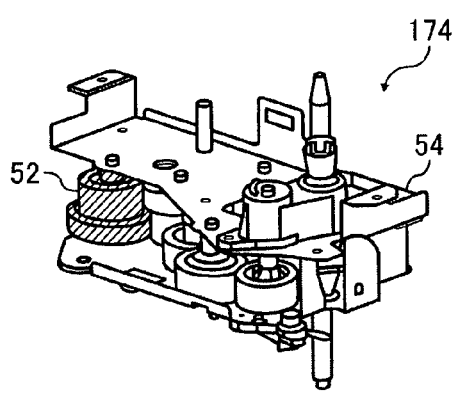
Figure 8C:
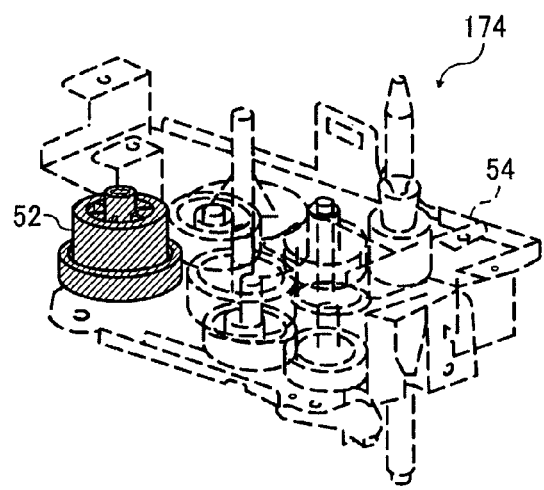

FIGS. 8A, 8B, and 8C illustrate non-limiting examples of images generated for display by the parts catalog system 10. FIG. 8A is an exemplary part image 52. FIG. 8B is an exemplary assembly image 174. FIG. 8C is another example of the assembly image 174.

As shown in FIG. 8A, the two-dimensional part image 52 is suitably rendered with a three-dimensional appearance. To obtain the part image 52, the image generator 40 specifies a part by points and lines in the three-dimensional model data 46 and performs appropriate rendering to generate an image within a closed surface.

Referring to FIGS. 8B and 8C, the assembly image 174 is an image of an assembly with a highlight on the part image 52. The assembly image 174 is formed of the part image 52 and an image of a unit 54 (hereinafter referred to as "unit image 54"). The image generator 40 generates the unit image 54 on the basis of the three-dimensional model data, such that the part image 52 and the unit image 54 may share a common viewpoint. The generated unit image 54 is stored as the image data.

In addition, the image generator 40 prepares unit images of different scales for a part. By default, the unit image 54 is stored as an image of a size suitable for display in a display area, showing clearly each respective part and a relationship between the part and the unit. The unit image 54 is enlarged and/or reduced from the default size.

The unit image 54 may be a representation of a solid model formed of parts, a wireframe model, or a translucent model. The images of different models are used selectively or alternately according to the intended purpose.

For example, the assembly image 174 of FIG. 8B includes the unit image 54 of solid model of a size suitable for showing the overall structure of the unit. The part image 52 is colored differently from the unit image 54 and partially hidden by another part. On the other hand, the assembly image 174 of FIG. 8C is an example of the enlarged image including the unit image 54 of translucent model.

In the assembly image 174, the shape of the part may be more clearly defined by coloring an outline of the part image 52 based on the boundary data, and the part image 52 is correctly located in the unit image 54 based on the location data. The boundary data and the location data are generated as the attribute data by the attribute data generator 42.

Figure 9A:
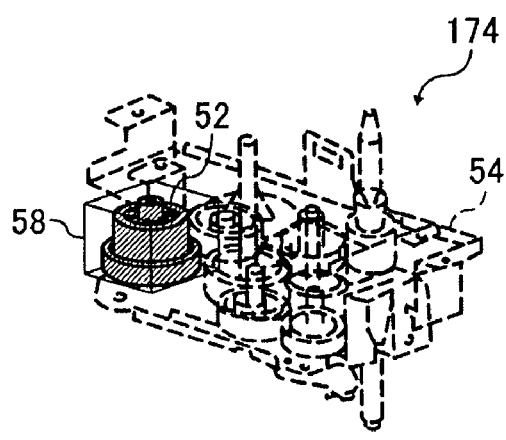
FIGS. 9A, 9B, 9C, and 9D illustrate attribute data generated by the parts catalog system of FIG. 5.

FIGS. 9A, 9B, 9C, and 9D illustrate the creation of the boundary data. Referring to FIG. 9A, the assembly image 174 includes the part image 52 for an object, the unit image 54, and a cuboid 58. The cuboid 58 is a bounding volume, e.g., a bounding box containing the object. The attribute data generator 42 specifies an outer frame of the three-dimensional model, computes a minimum rectangle containing a projection of the object along an axis, and generates the cuboid 58 based on the rectangle. The cuboid 58 may be recorded as the boundary data.

The attribute data generator 42 may analyze the part image to obtain the boundary data. The attribute data generator 42 may define an outline of the part image by distinguishing pixels having chrominance and/or luminance data from pixels having no color or brightness signal. The outline of the part image may then be recorded as the boundary data.

In addition, the attribute data generator 42 generates the location data specifying a particular pixel, e.g., a center pixel, for the part image and the unit image. The location data is used to accurately superimpose the part image on the unit image.

Figure 9B:
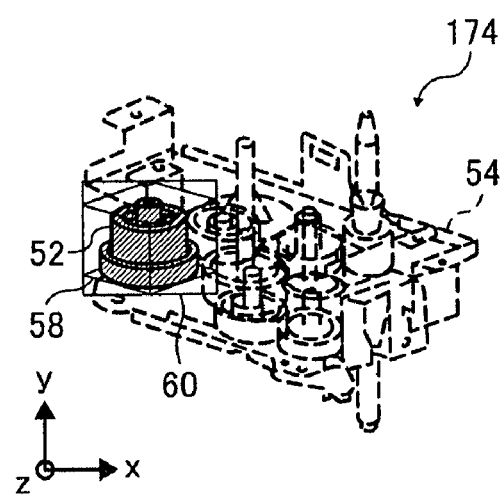

The boundary data is used to determine a boundary for enhancing the part image in the unit image. The boundary may be defined as a minimum rectangle enclosing an area specified by the boundary data. Referring to FIG. 9B, an example of a boundary, based on the boundary data of FIG. 9A, is described. The assembly image 174 includes the part image 52, the unit image 54, the cuboid 58, and a rectangle 60. The attribute data generator 42 analyzes an image of the cuboid 58 on an x-y plane, which may be defined by a corresponding plane arbitrarily set for the three-dimensional model, to obtain the rectangle 60 enclosing the cuboid image. The rectangle 60 is defined by two points on the x-y plane, e.g., a point with maximum x and y coordinates and a point with minimum x and y coordinates.

Figure 9C:
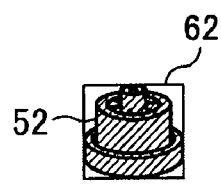

The boundary may also be generated from the boundary data specifying the outline of the part image. FIG. 9C illustrates an example of a boundary based on the outline of the part image 52. As shown in FIG. 9C, a rectangle 62 is a minimum rectangle enclosing the part image 52. The rectangle 62 is defined by four line segments and intersections.

Figure 9D:
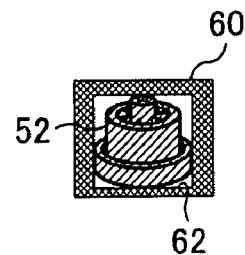

The area defined by the above rectangle is distinguished by color in the image of the three-dimensional model. For the representation of a front view, a top view, or a side view of the three-dimensional model, the rectangle 60 agrees with the rectangle 62. In general, the rectangle 60 is not the same as the rectangle 62 in the 3D perspective view of the three-dimensional model. As shown in FIG. 9D, the rectangle 60 encloses a larger area than the rectangle 62. For optimally generating the boundary data, vector data such as Bezier curve data may be stored in the database 31.

The above image data and the attribute data are transmitted to the parts catalog generator 44. The parts catalog generator 44 records the transmitted data in the parts catalog 50 such that the attribute data may correspond to the appropriate image data.

In addition, the parts catalog generator 44 records keywords for retrieval, which is generated manually or automatically based on the part configuration data 48.

Figure 10:
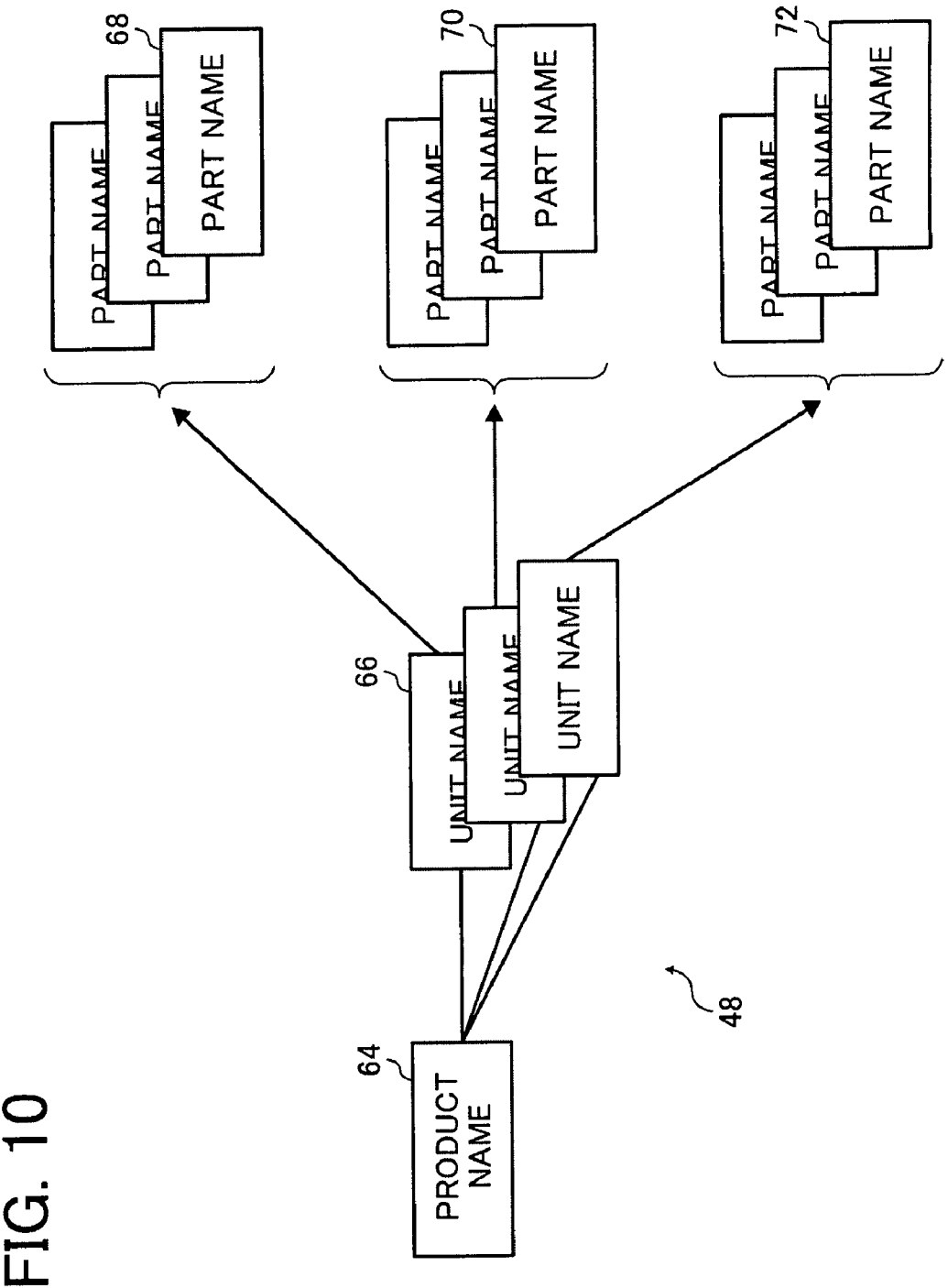
FIG. 10 illustrates a data structure of part configuration data of the parts catalog system of FIG. 5.

FIG. 10 illustrates a data structure of the part configuration data 48 for a product. The part configuration data 48 includes a product name 64, a unit name 66, and part names 68, 70, and 72. As shown in FIG. 10, the part configuration data 48 is hierarchically organized. Product information, such as name, unit location, and part configuration, is written in a text file or in a markup language, such as hypertext markup language (HTML) or extensible markup language (XML), which is parsed and hierarchically recorded as the part configuration data 48.

Referring to FIG. 11, data contents of the parts catalog 50 are described. The parts catalog 50 includes fields 74, 76, 78, and 80, and a part ID 73. The part ID 73 is a serial number of the part, for example. The field 74 contains the keywords for retrieval corresponding to the part ID. The field 76 contains the attribute data. The field 78 contains an illustration ID, and the field 80 contains an assembly image ID. The illustration ID is used to obtain the part image, and the assembly image ID is used to obtain the assembly image.

In FIG. 11, the field 74 contains keywords, such as a product name, a unit name, a part name, and function. The field 76 contains links to files and/or records for the attribute data of the part, including the angle for an oblique view, types of viewpoint, such as front view, side view, top view, or bottom view, and the rotation angle for the assembly image, as well as the boundary data and the location data. The field 76 may also contain a description of some types of the attribute data, such as viewpoint, a specified model for the assembly image, and scale of enlargement/reduction.

The image data may be linked to a predetermined file and/or address and recorded on the database 31. Another database, which is built for the image data, may also manage the image data in correspondence to the part ID and the attribute data ID.

The parts catalog 50 contains various types of assembly images different in scale, viewpoint, and color representation. The parts catalog system 10 provides a user with an appropriate assembly image such that the user may comprehend the location and/or number of an intended part, and the spatial relationship within a unit.

For example, the parts catalog system 10 may store data of assembly images of different scales for a single part. The parts catalog system 10 initially displays an assembly image of a default size. In response to an instruction given by the user, such as a mouse event, the parts catalog system 10 searches the data of assembly images to display the assembly image of an appropriate size.

Figure 12A:
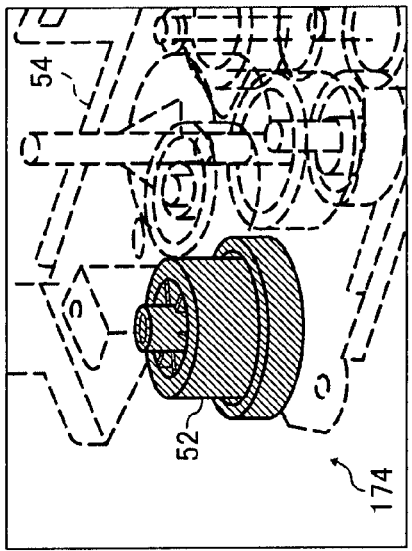
FIGS. 12A, 12B, 12C, and 12D illustrate assembly images generated by the parts catalog system of FIG. 5.
Figure 12B:
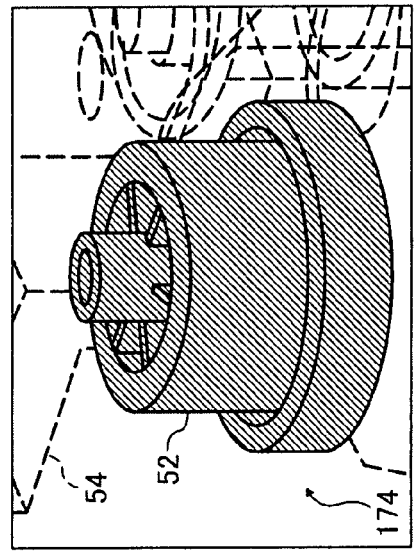
Figure 12C:
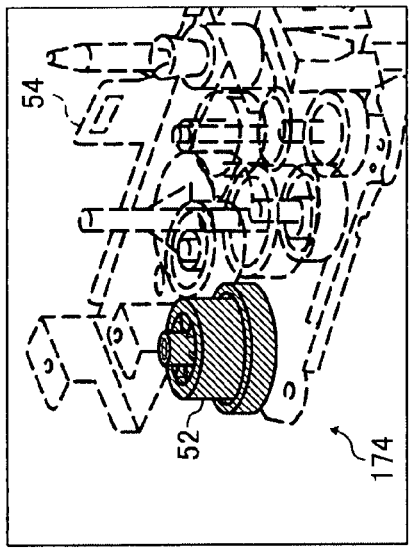

FIGS. 12A, 12B, 12C, and 12D are examples of assembly images for display. FIG. 12B is an example of the assembly image 174 of the default size. FIG. 12A is an example of the assembly image 174 of a reduced size. FIGS. 12B and 12C are examples of the assembly image 174 of an enlarged size.

The parts catalog system 10 provides a user interested in a particular part with an enlarged assembly image, such that the user may obtain a clear view of the part. As shown in FIGS. 12B and 12C, the part image 52 is located substantially at a center of the display area showing the assembly image 174 of the enlarged size. In addition, the parts catalog system 10 may display a full screen image of a particular section according to a specification by the user.

The parts catalog system 10 provides a user interested in a relationship between a particular part and a unit with a reduced assembly image, such that the user may comprehend the location of the part in the entire unit. As shown in FIG. 12A, the assembly image 174 of the reduced size is substantially centered on the display area.

Figure 12D:
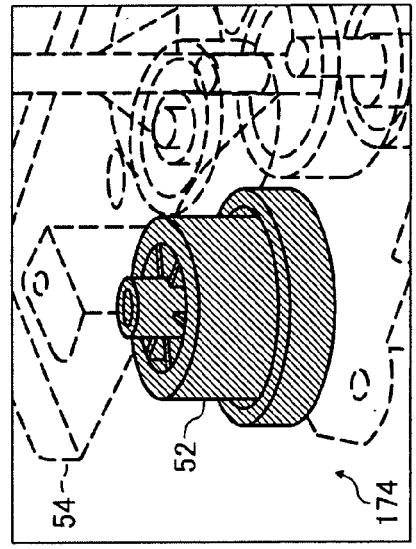
Figure 13A:
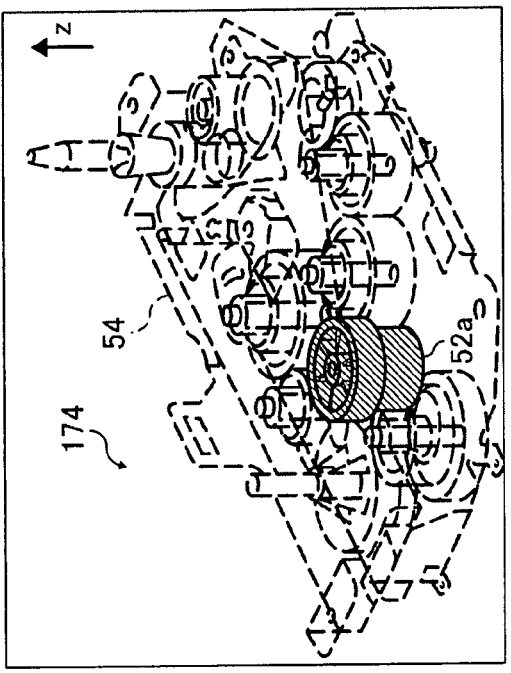
FIGS. 13A, 13B, 13C, and 13D illustrate assembly images generated by the parts catalog system of FIG. 5.
Figure 13B:
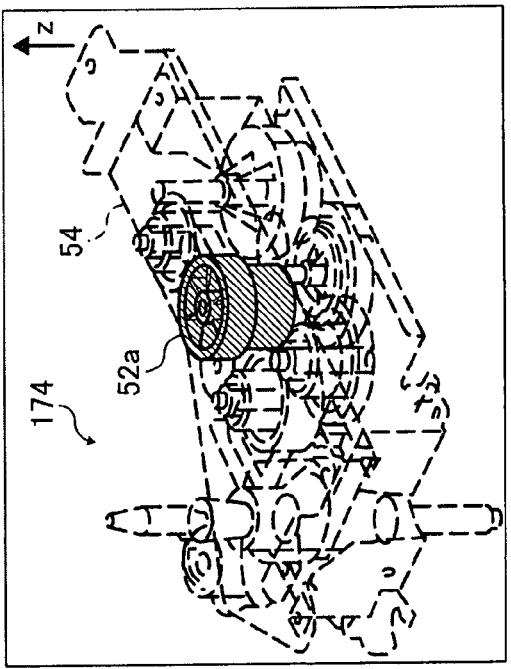
Figure 13C:
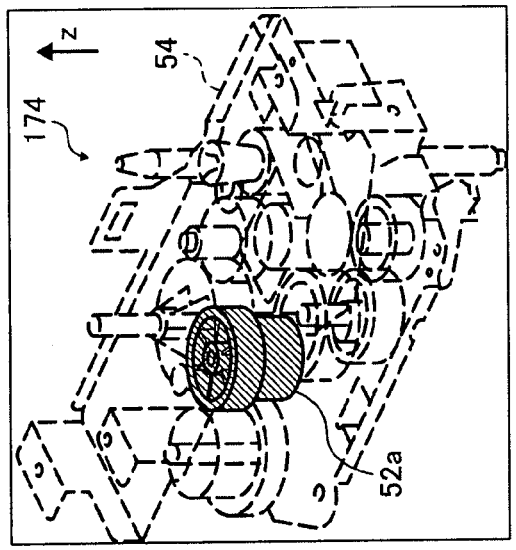
Figure 13D:
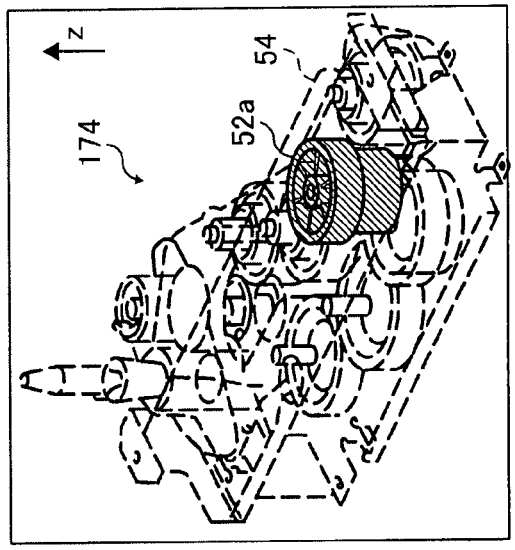

FIGS. 13A, 13B, 13C, and 12D are further examples of assembly images for display. In FIGS. 13A through 12D, the assembly images show a same unit rotated counter clockwise about a z-axis, including a part image 52a. The part image 52a is highlighted with an opaque color and superimposed on the translucent unit image 54.

Figure 14A:
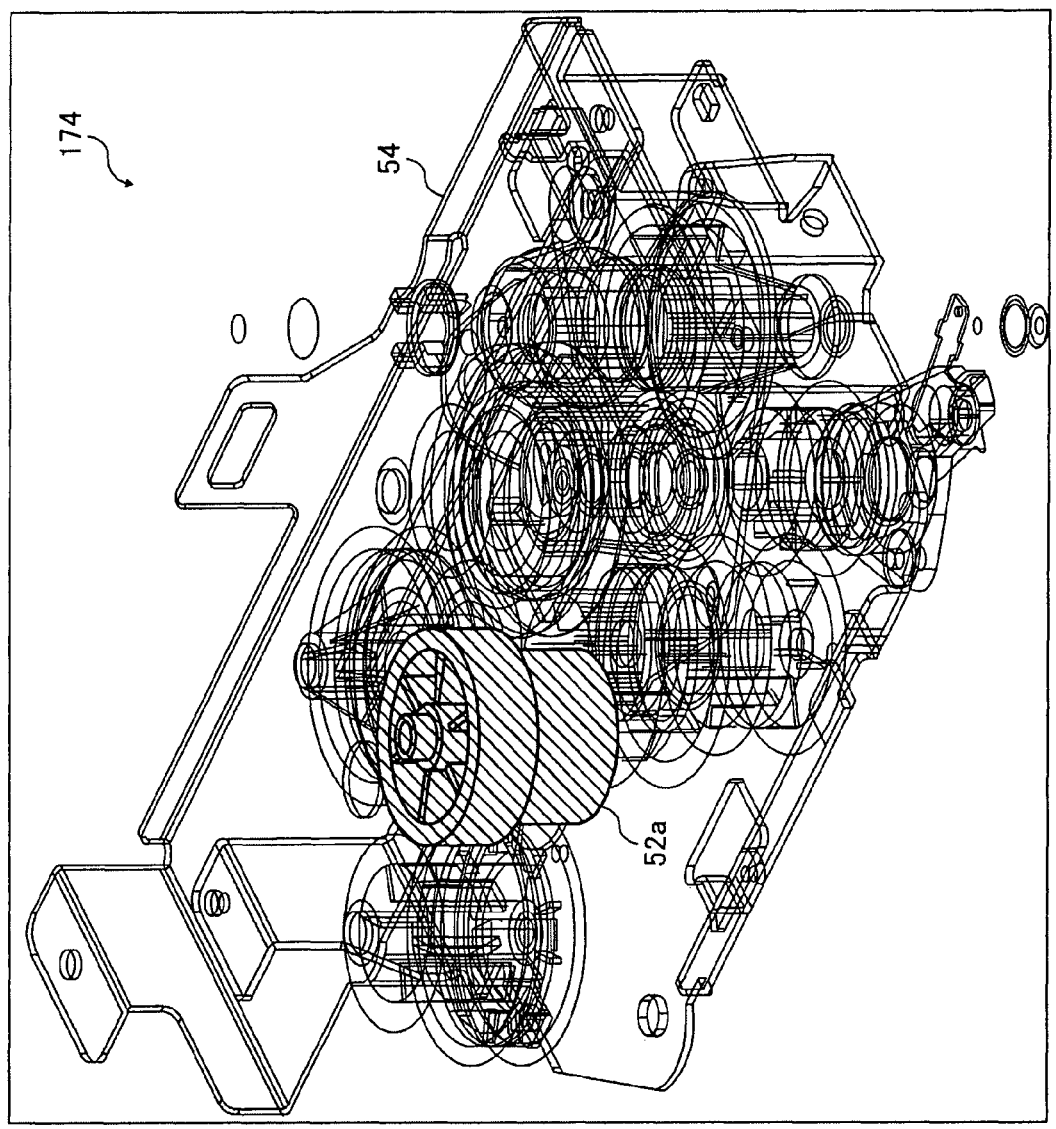
FIG. 14A illustrate an assembly image generated by the parts catalog system of FIG. 5.

FIG. 14A is another example of an assembly image 174 for display. In FIG. 14A, the assembly image 174 is formed of the part image 52a superimposed on the wireframe unit image 54. The part image 52a is highlighted with a semi transparent color, which hides the background color.

Figure 14B:
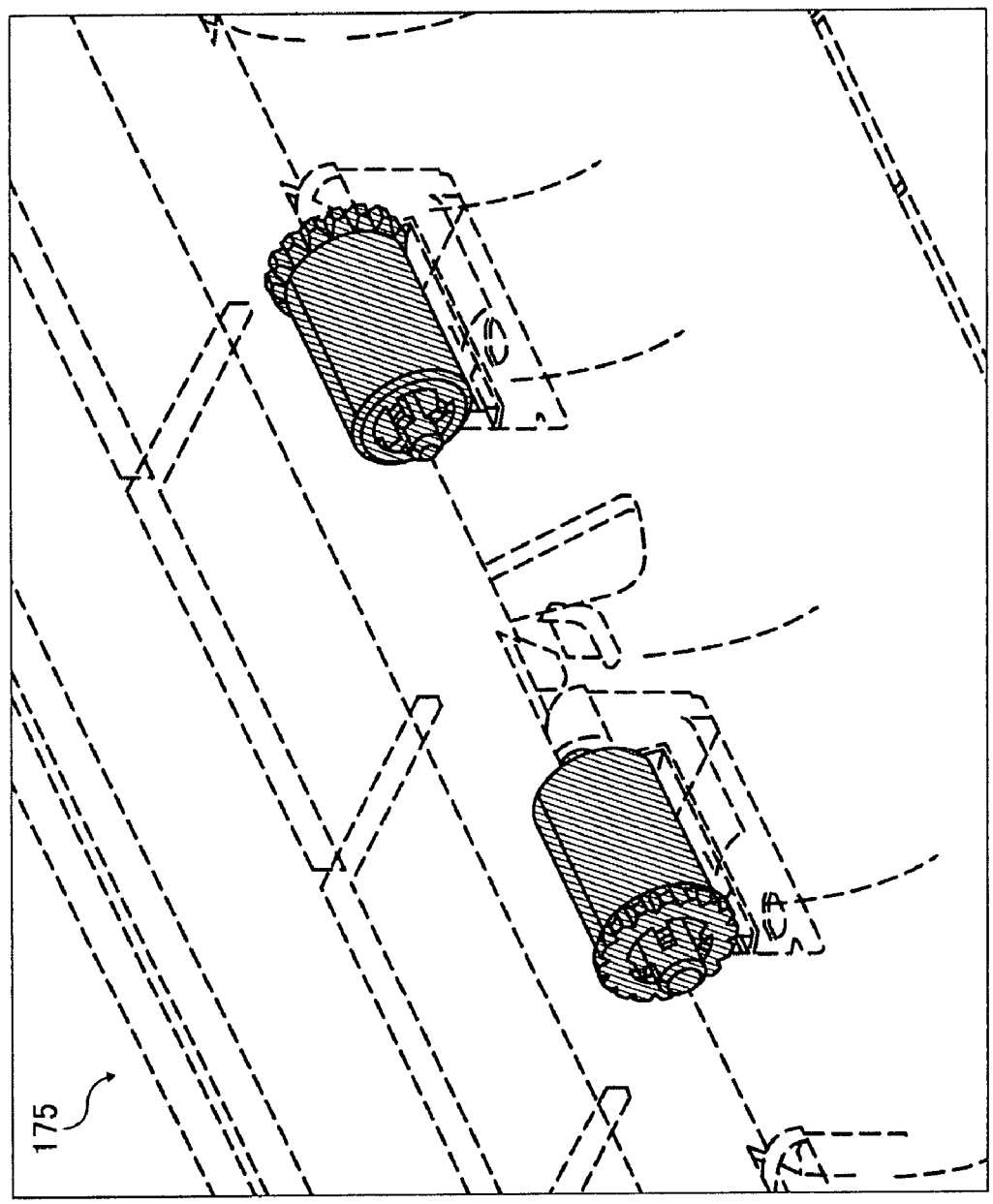
FIG. 14B illustrate an assembly image generated by the parts catalog system of FIG. 5.

FIG. 14B is an example of another assembly image 175 for display. As shown in FIG. 14B, the assembly image 175 shows a translucent unit model with a couple of parts highlighted with an opaque color. The assembly image 175 may provide a user with information, including the number of the intended part, in addition to the spatial relationship within the unit.

The assembly image 175 may be generated by the parts catalog system 10 without pre-storing or receiving the data of assembly images, but instead by producing each assembly image 175 from the three-dimensional model data in response to an instruction by the user. The method for displaying the assembly image 175 depends on performance of the workstation and/or the personal computer to be used.

Figure 15:
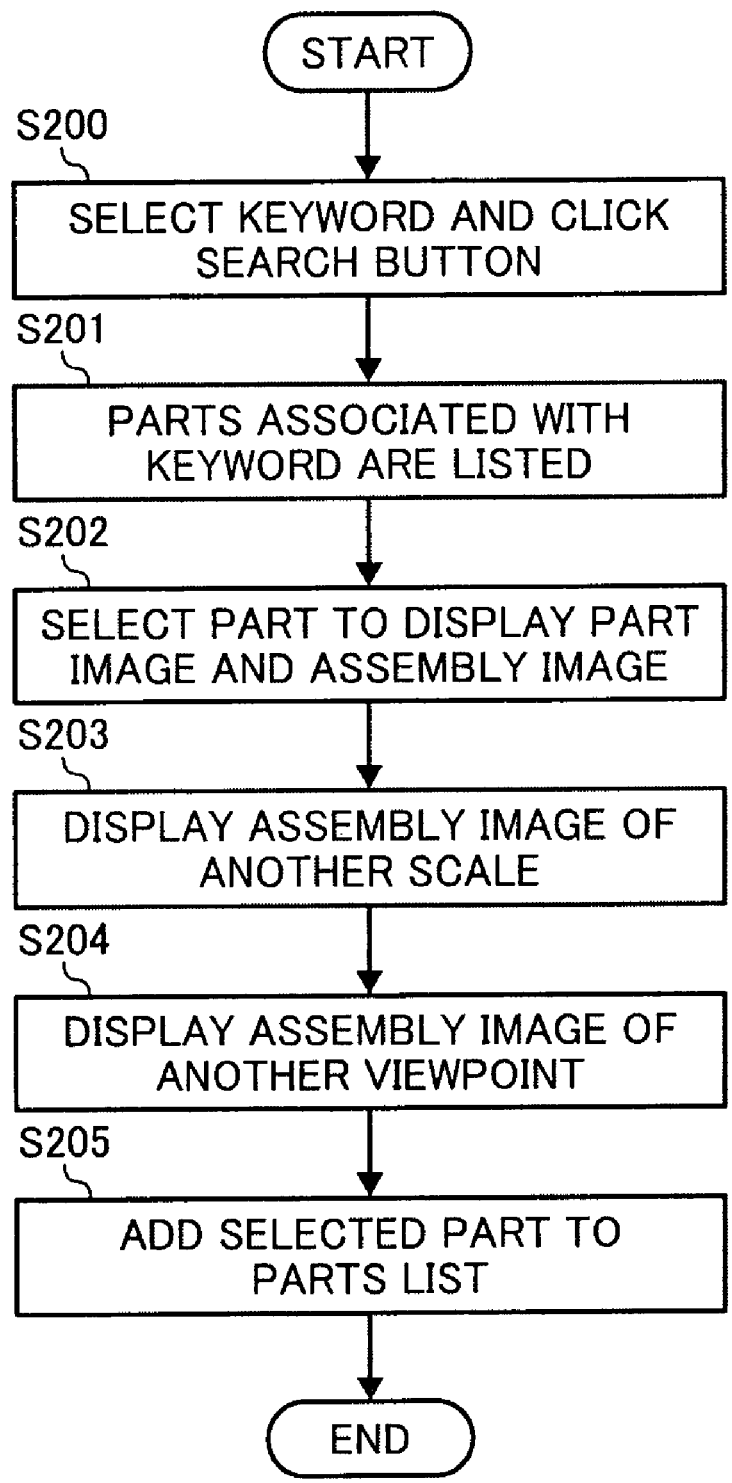
FIG. 15 is a flowchart illustrating use of the parts catalog system of FIG. 5.

The parts catalog system 10 may be used to create a parts list and to order listed parts, for example. FIG. 15 is a flowchart illustrating the use of the parts catalog system 10. Referring to FIG. 15, in step S200, the user selects a keyword from a pull-down menu of keyword input field displayed on the screen, and clicks a search button. In step S201, the parts catalog system 10 retrieves parts corresponding to the keyword and displays a list of search results. In step S202, the user selects a part with a cursor or a mouse-click, and the parts catalog system 10 displays the image and/or the assembly image for the part with a part name and a part ID in response to the mouse event.

In step S203, the parts catalog system 10 receives a mouse event by the user, such as a right click or scrolling, to display an assembly image of another scale. In step S204, the parts catalog system 10 receives a mouse event by the user, such as mouse movement with the center button pressed to retrieve and display an assembly image of another viewpoint.

In step S205, the user submits an input by pressing an enter button, for example, and the parts catalog system 10 adds the part ID of the selected part to a parts list. The information of the parts list, such as the part ID and number of the selected parts, may be transmitted to a server via the network for placing an order.

Figure 16A:
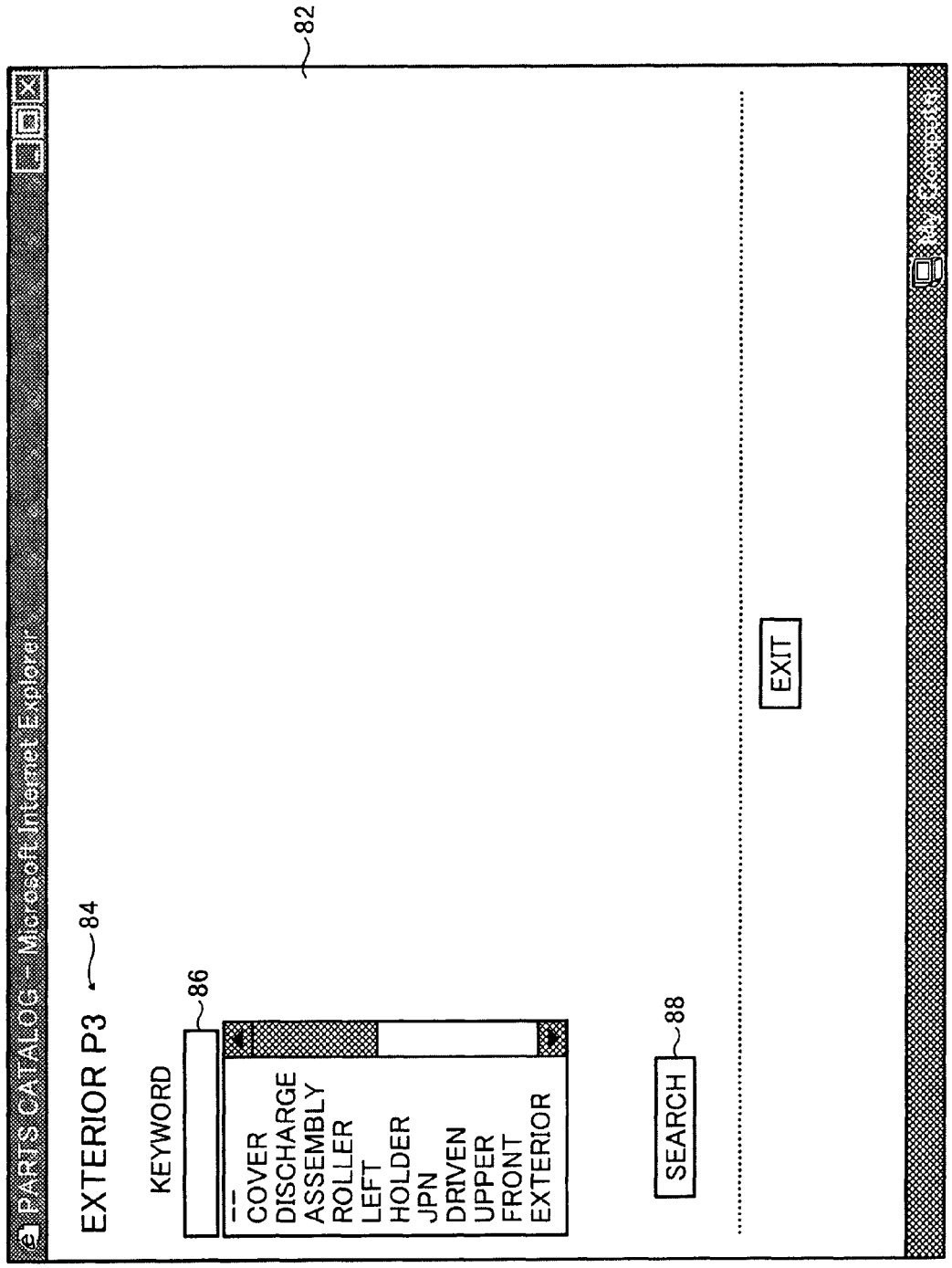
FIGS. 16A and 16B illustrate a GUI display generated by the parts catalog system of FIG. 5.
Figure 16B:
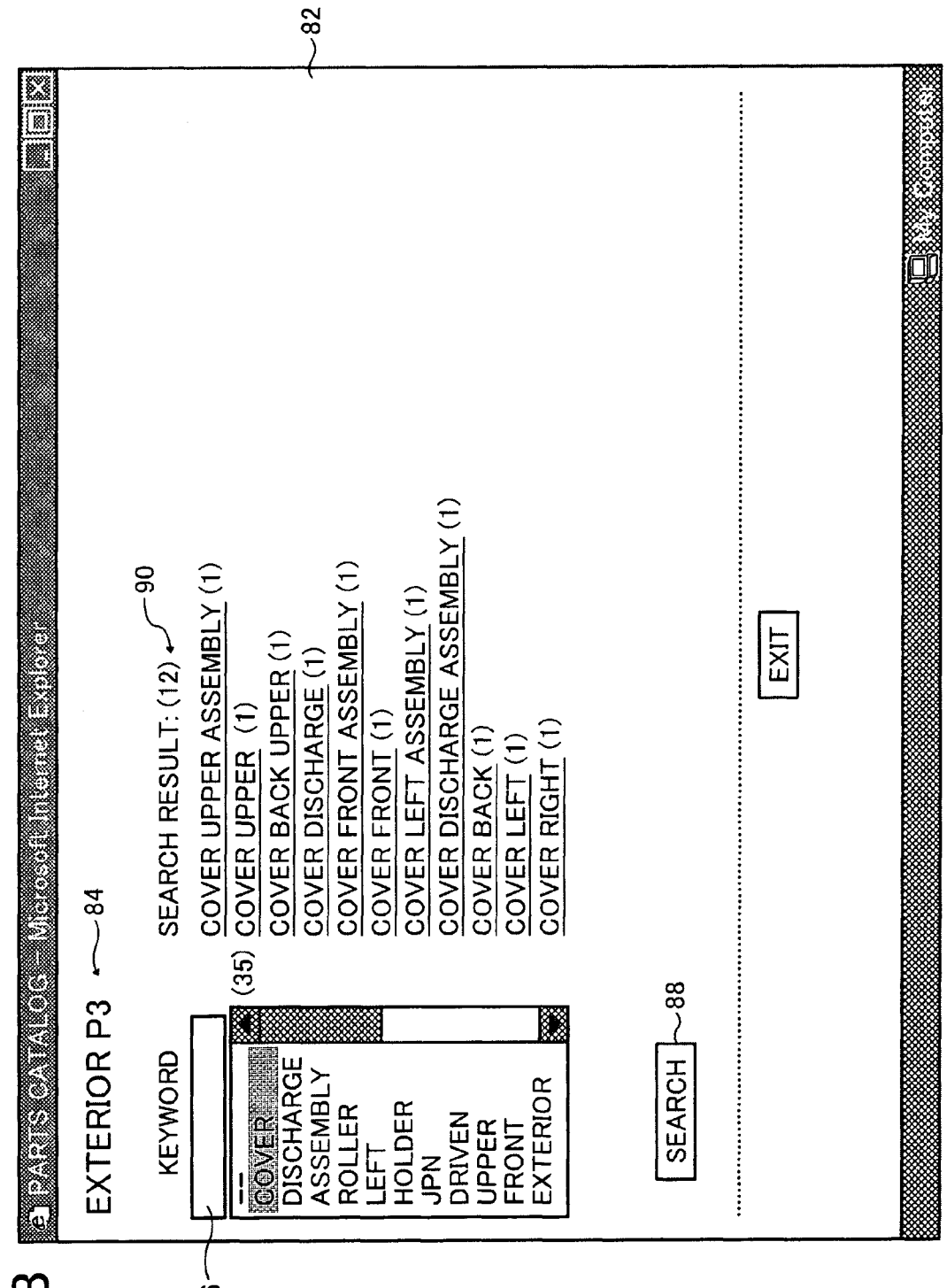

FIGS. 16A and 16B illustrate an example of a GUI display generated by the parts catalog system 10. Referring to FIG. 16A, a window 82 includes a field 84, a field 86, and a search button 88. The parts catalog system 10 displays the window 82 when the user specifies a unit. The field 84 displays the name of the specified unit "EXTERIOR P3". The field 86 is used to enter a keyword and contains a pull-down menu of keywords for parts included in the specified unit. The search button 88 is used to start a search. The parts catalog system 10 executes the search when the user enters a keyword and presses the search button 88.

Referring to FIG. 16B, the window 82 contains a field 90 in addition to the field 84, the field 86, and the search button 88. The field 90 displays the search results as a list of hyperlinks to data of retrieved parts with numbers indicating the numbers of parts contained in the unit. When the user selects a part "COVER LEFT", for example, the parts catalog system 10 displays the image of the selected part.

Figure 17:
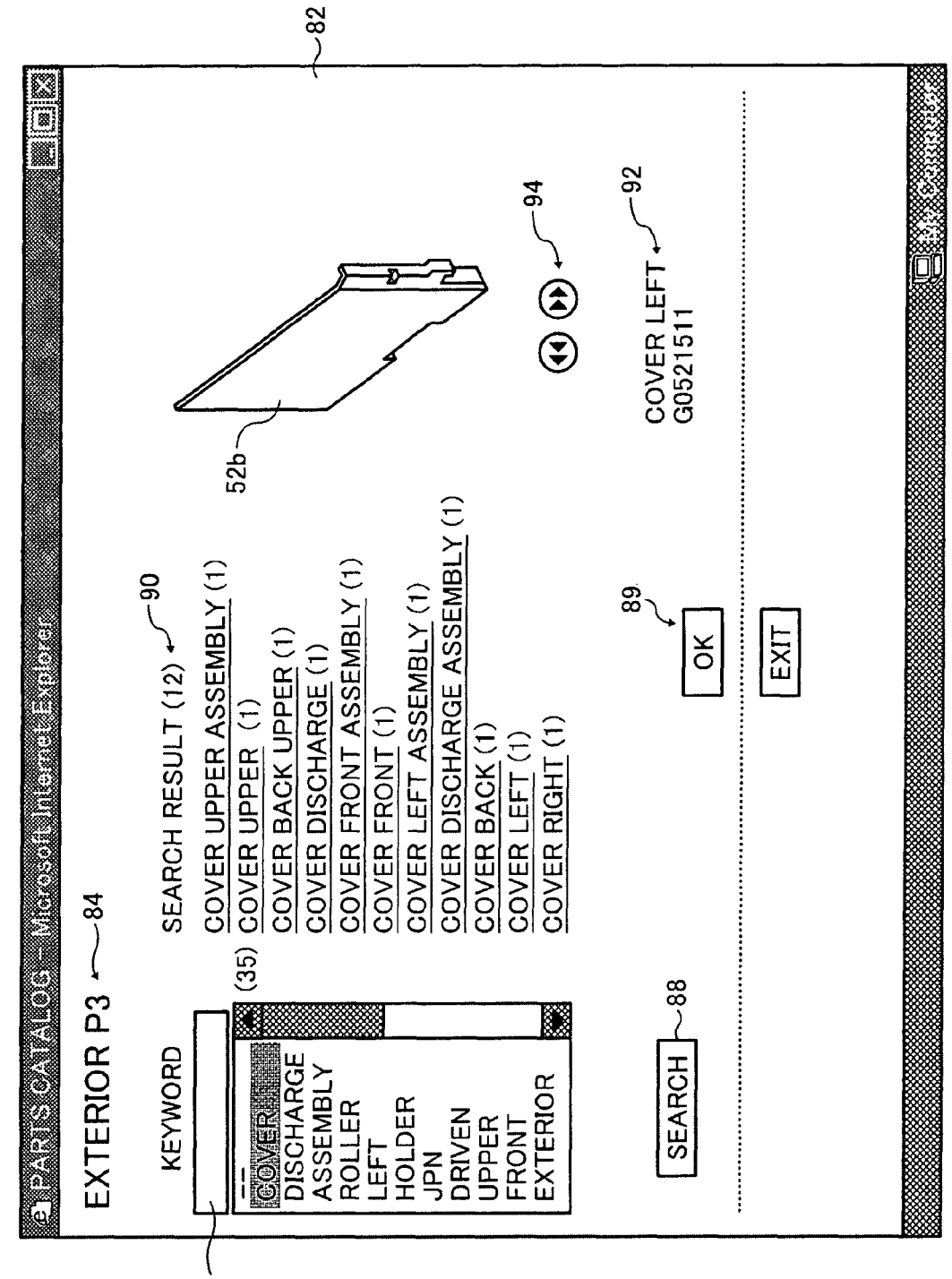
FIG. 17 illustrates a GUI display generated by the parts catalog system of FIG. 5.

FIG. 17 illustrates an example of a display showing the image of a user specified part. Referring to FIG. 17, the window 82 includes a part image 52b, a field 92, a rotation button 94, and an enter button 89 in addition to the field 86, the search button 88, and the field 90. The field 92 displays the name of the selected part "COVER LEFT" and the part ID. The rotation button 94 is used to rotate the part image 52b. The parts catalog system 10 provides the part image 52b of another viewpoint when the user clicks the rotation button 94. The enter button 89 is used to enter the selected part to a parts list.

Figure 18A:
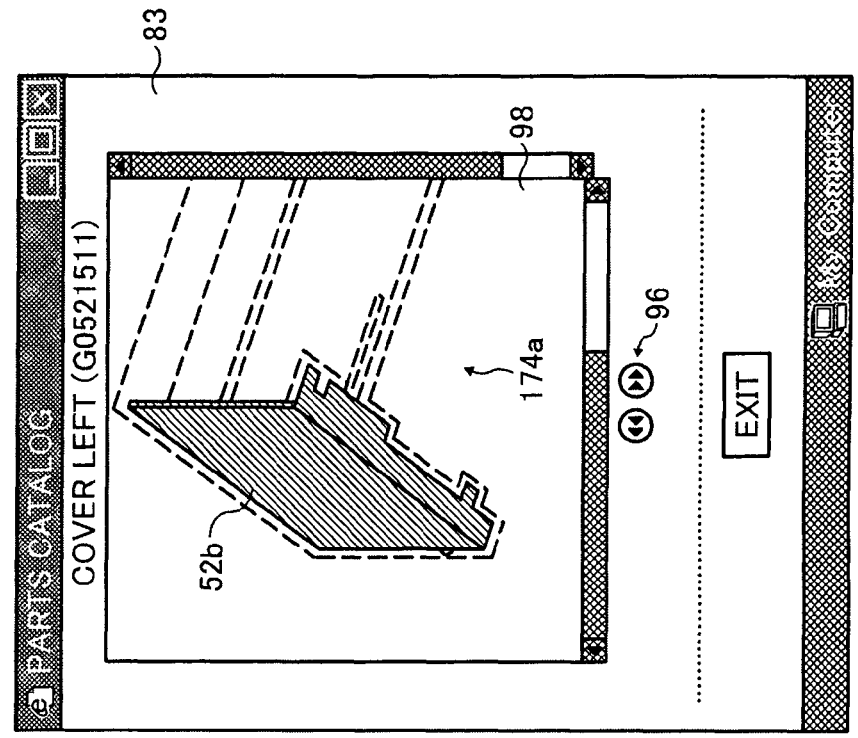
FIGS. 18A and 18B illustrate a GUI display generated by the parts catalog system of FIG. 5.
Figure 18B:
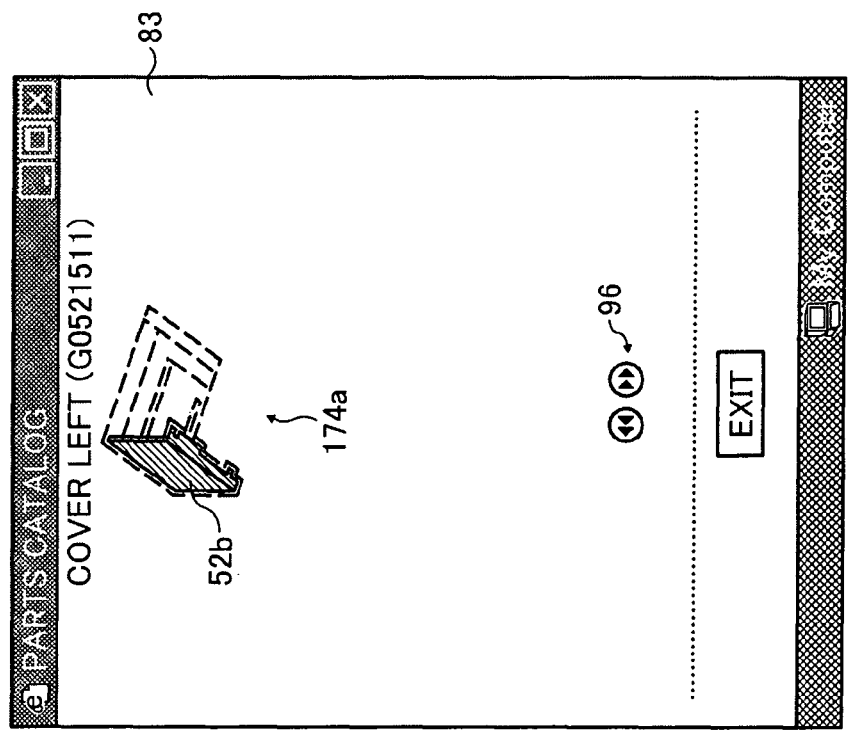

In addition, the user may click the part name in FIG. 17 to open another window 83. FIGS. 18A and 18B illustrate an example of such a display provided by the parts catalog system 10 in response to the input by the user. Referring to FIG. 18A, the window 83 includes an assembly image 174a and a zoom button 96. The assembly image 174a provides a view of the selected part in a unit. The zoom button 96 is used to change the scale of the assembly image 174a. The user may click the zoom button 96 to obtain an enlarged view of the assembly image 174a as shown in FIG. 18B. Referring to FIG. 18B, the window 83 includes a display area 98 and the zoom button 96. The display area 98 displays the enlarged view of the assembly image 174a. As shown in FIG. 18B, the part image 52b is located at an approximate center of the display area 98 to provide a specific view of the intended part.

The parts catalog system 10 is a computer-executable program written in an object-oriented language, such as C, C++, JavaBeans™, JavaApplet™, JavaScript™, Perl™, and Ruby. The program may be distributed using a computer-readable recording medium.

Those skilled in the computer and software arts will appreciate that the invention may be readily implemented using a conventional general purpose digital computer programmed according to the teachings of the present specification, and that appropriate software coding can readily be prepared based on the teachings of the present disclosure. The present invention may also be implemented by the preparation of application specific integrated circuits or by interconnecting an appropriate network of conventional component circuits. Accordingly, the invention may be embodied in software, firmware, or combinations thereof. In addition, the described architecture, functionality, and operation of the inventions' features may be performed out of order (as compared to above described orders of operations), concurrently, serially, in parallel, and the like.

Numerous additional modifications and variations are possible in light of the above teachings. It is therefore to be understood that within the scope of the appended claims, the disclosure of this patent specification may be practiced otherwise than as specifically described herein.

What is claimed is:

1. A computer-readable storage device containing a set of instructions that causes a digital device to perform a process, the process comprising the steps of:
   storing or receiving model data of a three-dimensional model representing at least respective locations of components configured to be assembled within a unit;
   generating image data of a two-dimensional image illustrating a three-dimensional perspective of the three-dimensional model;
   determining, based on the generated image data of the two-dimensional image, whether the three-dimensional model represents a first component having a configuration that requires revision to a portion of the two-dimensional image illustrating a neighboring component; and
   generating image revision data representing an image of at least a portion of the unit that enhances recognition of the neighboring component.

2. The computer-readable storage device according to claim 1, wherein the image revision data represents a simplex image of the neighboring component.

3. The computer-readable storage device according to claim 1, wherein the image revision data represents an image of the unit that enhances recognition of the neighboring component.

4. The computer-readable storage device according to claim 1, wherein the image revision data represents an image of the unit with the neighboring component shaded or highlighted in relation to other components.

5. The computer-readable storage device according to claim 1, further comprising:
   translating the two-dimensional image, based on the image revision data, to locate the neighboring component at an approximate center of a display window of a display interface; and
   scaling the translated two-dimensional image to more closely fit the display window.

6. The computer-readable storage device according to claim 1, wherein the image revision data represents a display image that is expanded beyond edges of a display window of a display interface to provide a centered close-up image illustrating the specified neighboring component.

7. A method of geometric data processing comprising:
   storing or receiving a first set of model data representing a three-dimensional model of components assembled within a unit, the first set of model data being different than a second set of model data representing the three-dimensional model with respect to a change in at least a size or shape of a first component;
   determining whether the first component of the first set of model data has changed in size or shape;
   converting the first set of model data to image data of two-dimensional images illustrating three-dimensional perspectives of respective components viewed from the same viewpoint or angle to a plane of the three-dimensional model;
   specifying, based on the image data of the two-dimensional images, neighboring components influenced by the change of the first component, such that a revision of the two-dimensional images respectively illustrating the neighboring components is required to accommodate the change; and
   generating image revision information representing an image of at least a portion of the unit that enhances recognition of the specified neighboring components.

8. The method of geometric data processing according to claim 7, wherein the step of specifying the neighboring components is based on a boundary formed by projecting the first component onto a plane of a two-dimensional image that illustrates the image parts of the first component and neighboring components.

9. The method of geometric data processing according to claim 7, wherein the image revision information indicates each one of the specified neighboring components in a form of a simplex image.

10. The method of geometric data processing according to claim 7, wherein the image revision information indicates each one of the specified neighboring components in a form of an image of the unit that visually enhances the specified neighboring components.

11. The method of geometric data processing according to claim 7, wherein the image revision information indicates each one of the specified neighboring components in a form of an image of the unit that shades the specified neighboring components differently than other components.

12. The method of geometric data processing according to claim 7, wherein the image revision information indicates each one of the specified neighboring components in a form of a display image that is expanded beyond edges of a display window of a display interface to provide a centered close-up image illustrating at least one of the specified neighboring components.

13. The method of geometric data processing according to claim 7, further comprising the steps of:
   translating the display image such that one of the specified neighboring components is located at an approximate center of a display window of a display interface; and
   scaling the display image to fit the display window.

* * * * *